Oct. 1, 1963    A. N. ORMOND    3,105,564
APPARATUS FOR MEASURING STATIC LOADS
Filed Oct. 13, 1960

INVENTOR.
ALFRED N. ORMOND
BY Elliott & Pastoriza
ATTORNEYS

United States Patent Office 3,105,564
Patented Oct. 1, 1963

3,105,564
APPARATUS FOR MEASURING STATIC LOADS
Alfred N. Ormond, P.O. Box 238, Inglewood, Calif.
Filed Oct. 13, 1960, Ser. No. 62,395
4 Claims. (Cl. 177—211)

This invention relates broadly to measuring apparatus and more particularly to an improved load measuring system for providing an electrical output signal that is a function of only the static load of a body exerting both static and dynamic forces.

Load measuring apparatus of the type under consideration generally includes a load cell together with suitable strain gauges secured thereto for providing an electrical output signal that is a function of the loading on the load cell. The weight of any object to be measured is applied to the load cell to cause physical deformation of the same which in turn will distort the attached strain gauges to vary the output electrical signal in a proportional manner.

In many instances, a particular object to be weighed is in motion. For example, a railroad car rolling over a weighing platform constitutes one such situation. In such instances, dynamic load forces are established as well as the static load forces, these dynamic load forces being superimposed or algebraically added to the static load. As a consequence, the output of the measuring circuit reflects this sum, and at any instantaneous reading, it is almost impossible to determine the true value of the static load.

With the above in mind, it is a primary object of this invention to provide an improved load measuring apparatus which will provide an output signal that is a function only of the static load notwithstanding that the object being weighed may be in motion with the attendant establishment of dynamic forces.

Briefly, the invention contemplates the provision of a conventional load measuring apparatus in the form of a load cell provided with tension and compression strain gauges secured to the cell at right angles to each other. These elements are connected into a first electrical bridge to provide a first output signal that is a function of the compression loading on the cell. Also provided are additional strain gauges secured to the load cell and connected into a second bridge circuit which is identical to the first mentioned bridge circuit to provide a second output signal.

By energizing the first and second bridges with opposite polarities, the first output signal can be made exactly equal to but opposite in polarity to the second electrical output signal. By then employing suitable condensers, the dynamic variations may be passed from the first bridge circuit to the second bridge circuit and added algebraically thereto to cancel the dynamic variations at the output of the second bridge circuit with the result that the net output constitutes a signal which is a function only of the static load.

A better understanding of the invention will be had by referring to the accompanying drawings, in which.

Figure 1:
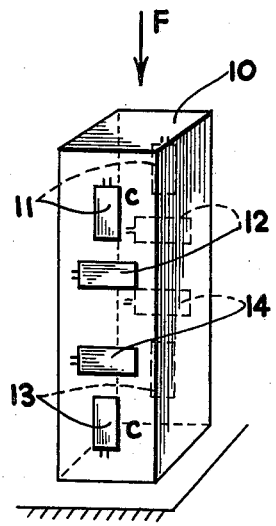
FIGURE 1 is a schematic diagram of a load cell constituting part of the apparatus of the present invention.

Referring first to FIGURE 1, there is shown a load cell 10 which is normally positioned to be subject to both a static and dynamic loading as indicated by the arrow F. Secured to the sides of the load cell are a set of two pairs of strain gauges 11 and 12 disposed on opposite sides of the cell 10 and arranged to be responsive to compression and tension forces respectively. To this end, the load cells are mounted at right angles to each other.

The load cell 10 also includes a second set of additional pairs of strain gauges 13 and 14 symmetrically arranged on the block with respect to the strain gauges 11 and 12 as shown.

Figure 2:
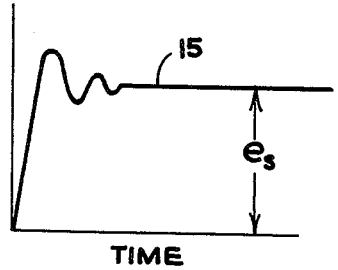
FIGURE 2 is a plot of a voltage output signal that is a function of a static loading from a conventional bridge circuit.

Considering first the pairs of strain gauges 11 and 12, and assuming they are connected into a bridge circuit in a conventional manner, the output signal in response to a static loading on the cell 10 would appear as indicated in FIGURE 2. Thus, upon application of the load, there are initially small transients as indicated at the initial portion of the time plot until steady state conditions prevail as indicated by the horizontal line 15 at a definite fixed voltage. This voltage is indicated $e_s$ and is a direct function of the static loading.

Figure 3:
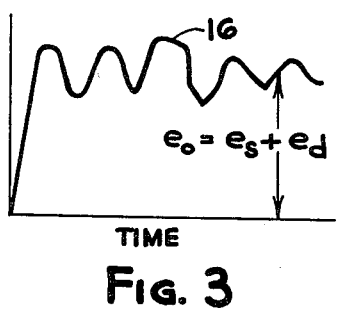
FIGURE 3 is a plot similar to FIGURE 2 illustrating an output signal representative of both static and dynamic loading.

Referring to FIGURE 3, if the object being weighed is in motion, there will inevitably be present dynamic forces super-imposed on the static force. These dynamic forces are a direct consequence of the motion of the object and will result in an output voltage signal from the bridge as indicated by the wavy line 16 in FIGURE 3. At any instance, this output signal $e_o$ is equal to the static signal $e_s$ plus the signal resulting from the dynamic loading designated $e_d$.

Figure 4:
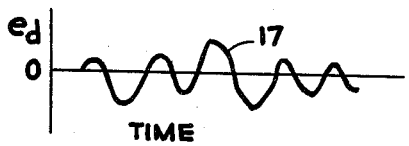
FIGURE 4 is a plot of the dynamic portion of the output signal only.

If the output signal as illustrated in FIGURE 3 is filtered as by blocking condensers to remove the static component $e_s$, then the resulting output $e_d$ alone will appear as indicated at 17 in FIGURE 4.

Figure 5:
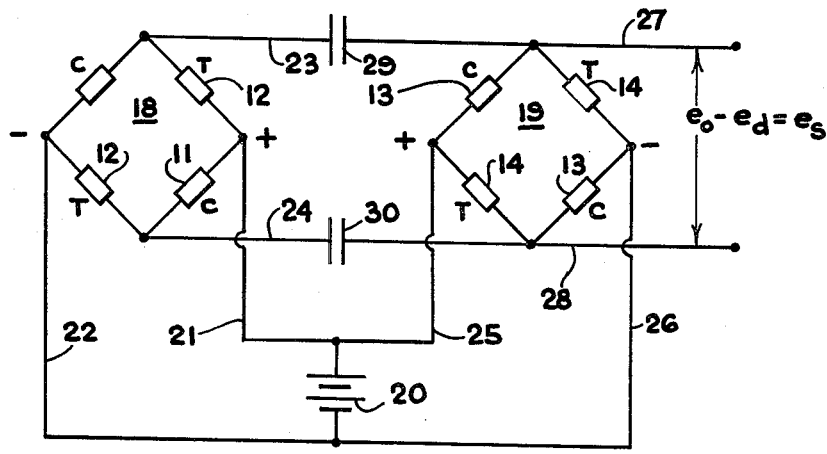
FIGURE 5 is a schematic diagram of the electrical circuit portion of this invention for providing a net output electrical signal that is a function only of the static loading.

With the foregoing in mind, in order to provide an output signal that is a function only of the static loading, a circuit as illustrated in FIGURE 5 may be employed. In this circuit, the first electrical bridge comprising the elements 11 and 12 of FIGURE 1 is connected as indicated at 18 and as shown the strain gauges 11 subject to compression forces are connected in opposite arms of the bridge and the strain gauges 12 responsive to tension forces are connected in the remaining opposite arms. A second bridge comprising the elements 13 and 14 of FIGURE 1 is shown at 19 in FIGURE 5 and is similar in every respect to the bridge 18.

By now energizing these bridges with opposite polarity, the output electrical signals therefrom as depicted in FIGURE 3 will be exactly equal but of opposite polarity. To this end, there is provide an energy source in the form of a battery 20 feeding the first bridge 18 through the positive lead 21 and return circuit lead 22 with one given polarity as indicated by the plus and minus signs. The output leads from the first bridge 18 are indicated at 23 and 24. Similarly, the battery 20 feeds the second bridge 19 through the positive lead 25 and return lead 26 with voltage of polarity opposite to that of the first bridge 18. The resulting output on lines 27 and 28 will thus be equal in magnitude but opposite in polarity to the output on the lines 23 and 24 in the first bridge.

Assume for example that the output of the second bridge 19 considered alone appearing on the leads 27 and 28 would be that depicted in FIGURE 3. The output at the leads 23 and 24 for the first bridge considered alone would then be the same as shown in FIGURE 3 except that the polarity would be reversed at every instance of time.

By providing filtering condensers 29 and 30 in the output leads 23 and 24 of the first bridge 18, the portion of the output signal corresponding to the static loading is blocked and only the dynamic loading signal portion as indicated by the curve 17 of FIGURE 4 will be passed to the second bridge 19. Since this dynamic portion is in reverse polarity to the corresponding dynamic portion at the output of the bridge 19, it will effect a substantial cancellation of that dynamic portion so that the net output from the second bridge 19 will simply be a function of the static loading. Thus, the output signal $e_o$ minus the dynamic loading signal $e_d$ is equal to the static loading signal $e_s$ as shown in FIGURE 5.

From the foregoing, it will thus be seen that the present invention provides a unique measuring circuit which will yield an output electrical signal that is a function of static loading only notwithstanding there may be dynamic loading super-imposed on the static loading.

What is claimed is:

1. An apparatus for indicating the static load of an object in which the instantaneous load of said object constitutes the algebraic sum of said static load and dynamic load forces, comprising, in combination: first and second means each responsive to said object for providing a substantially identical electrical output signal that is a function of said instantaneous load; means for reversing the polarity of the electrical output signal from one of said means; and means for selecting only that portion of said electrical output signal that is a function of said dynamic load forces from the electrical output signal from said one of said means and algebraically adding it to the electrical output signal from the other of said means to provide a net electrical output signal that is a function only of said static load.

2. An apparatus for measuring the static load of an object in motion in which the total instantaneous load is equal to the algebraic sum of said static load and dynamic load forces established as a consequence of said motion, comprising, in combination: first load responsive means responsive to said object for providing a first electrical output signal that is a function of the algebraic sum of said static load and dynamic load forces; second load responsive means responsive to said same object for providing a second electrical output signal of equal magnitude and opposite polarity to said first signal; filter means connected to the output of said first load responsive means to receive said first electrical output signal and filter that portion of said first electrical output signal that is a function of said static load so that only the portion of said first signal that is a function of said dynamic load forces remains; and means algebraically adding said last mentioned portion to said second electrical output signal whereby the net electrical output signal from said second load responsive means is a function only of said static load.

3. An apparatus according to claim 2, in which said first load responsive means comprises load cell means subject to said total instantaneous load and strain gauge element secured to said load cell means and connected in a bridge circuit energized with a given polarity to provide said first electrical output signal; said second load responsive means comprising strain gauge elements secured to said load cell means and connected in a bridge circuit identical to said first mentioned bridge circuit and energized with a polarity opposite to said given polarity to provide said second electrical output signal; said filter means comprising condensers connected between the respective outputs of said bridge circuits.

4. An apparatus for measuring the static load of an object in motion in which the total instantaneous load is equal to the algebraic sum of said static load and dynamic load forces established as a consequence of said motion, comprising, in combination: a load cell subject to said total instantaneous load; a first set of two pairs of strain gauges secured to said load cell at right angles to each other to indicate compression and tension forces and connected together in a first bridge circuit; a second set of two pairs of strain gauges secured to said load cell at right angles to each other and connected together in a second bridge circuit identical to said first bridge circuit; a source of energy connected to feed said bridge circuits in reverse polarity so that the signal output from said first bridge circuit is equal and opposite in polarity to the signal output from said second bridge circuit; direct current blocking condensers connected in the output of said first bridge circuit so that the signal from the condensers in the output of said first bridge circuit is a function only of said dynamic load forces; and means combining said last mentioned signal with the signal output of said second bridge circuit whereby the net signal output from said second bridge circuit is a function only of said static load.

References Cited in the file of this patent

UNITED STATES PATENTS 2,767,974     Ballard et al. _____ Oct. 23, 1956

OTHER REFERENCES

Perry and Lissner, "The Strain Gage Primer," McGraw-Hill, New York, 1955. Pages 72 and 73 relied on.